United States Patent Office.

HENRY M. JOHNSTON, OF NEW YORK, N. Y.

Letters Patent No. 105,692, dated July 26, 1870; antedated July 11, 1870.

IMPROVEMENT IN LAMBREQUINS.

The Schedule referred to in these Letters Patent and making part of the same.

*To all whom it may concern:*

Be it known that I, HENRY M. JOHNSTON, of the city, county, and State of New York, have invented a new and improved Cloth Lambrequin; and I do hereby declare that the following is a full, clear, and exact description thereof.

This invention relates to a lambrequin made of new materials, and adapted to the decoration or ornamentation of windows, or wherever a cheap, rich, and beautiful lambrequin is required.

I will now proceed to describe my invention, so as to enable others skilled in the art to make and use the same.

I select for the body of my improved lambrequin, buckram, crash, or other cheap common cloth, and I fill in the meshes with any suitable substance or composition of matter.

The composition I prefer to use is composed of two ounces of glue, well soaked, and dissolved in eight ounces of water, after which two ounces of glycerine is added, the glycerine being added to impart suppleness to the cloth after the composition is dried in or upon it.

I then take one pound of blanc fix, and mix it intimately with eight ounces of water, and then mix the solution of glue and glycerine with the blanc fix and water.

Any suitable pigment may be added to the composition for the purpose of imparting color.

I then incorporate the composition with the cloth by means of a brush, bath, or other suitable device.

The cloth is then hung up to dry, and, after drying, is passed between calendering-rolls to smooth its surface.

Any other suitable substance or composition of matter may be used, in lieu of the composition described, for the purpose of filling the meshes, and imparting smoothness to the surface of the cloth.

The body of the lambrequin may be made up of several thicknesses of cloth, of equal or variable qualities and thickness, united together by pressure, after being filled with the composition, and, when dry, should then be passed between calendering-rolls to smooth the surface.

If it is desired to give a very smooth surface to the cloth, for the purpose of imitating silk and other materials of fine texture, the surface of the cloth should be again coated with the composition, and, after drying, passed between the calendering-rolls as before.

After calendering, I then print the outline of the lambrequin upon the single sheet or the combined sheets of cloth, from which I then cut it by means of dies, shears, or other suitable device.

I then decorate or ornament its surface with flocking, water or oil colors, either plain or printed in design, or with gilding, bronzing, or any other suitable style of decoration or ornamentation. The design of the lambrequin may be decorated on the cloth before it is cut, and, after the decoration is finished, it may then be cut, but I prefer cutting the lambrequin before decorating it, so as to admit of covering the edges during the process of the decoration.

The texture and quality of various materials of which lambrequins are now made can be imitated by embossing with the rolls, dies, or any other suitable device.

Having thus described my invention,

I claim as new and desire to secure by Letters Patent—

The new article of manufacture, a cloth lambrequin, substantially as described.

HENRY M. JOHNSTON.

Witnesses:
O. S. FOLLETT,
DAVID EARLE.